United States Patent
> Von Conrad et al.

[15] 3,659,792

[45] May 2, 1972

[54] METHOD OF PROCESSING EFFLUENT SLUDGE

[72] Inventors: Eugen Von Conrad, Friesenring; Kurt Rosner; Ludwig Meyer, both of Munster/Westphalia, all of Germany

[73] Assignee: Hazemag Hartzerkleinerungs-und Zement-maschinenbau-Gesellschaft mbH, Munster, Germany

[22] Filed: Aug. 21, 1969

[21] Appl. No.: 851,970

[30] Foreign Application Priority Data

Aug. 23, 1968 Germany................P 17 84 605.8

[52] U.S. Cl................................................241/21, 241/27
[51] Int. Cl.....................................B02c 13/09, B02c 21/00

[58] Field of Search........................241/15, 17, 21, 22, 27

[56] References Cited

UNITED STATES PATENTS 1,543,154   6/1925   Fox...................241/46 A UX
3,159,353   12/1964  Atwater.............241/46 A UX Primary Examiner—Donald G. Kelly
Attorney—Michael S. Striker

[57] ABSTRACT

Effluent sludge obtained upon clarification of waste effluent, is admixed with solid refuse either before or subsequent to reduction of the solid refuse to particulate state in an impact grinder.

8 Claims, 1 Drawing Figure

Patented May 2, 1972 3,659,792
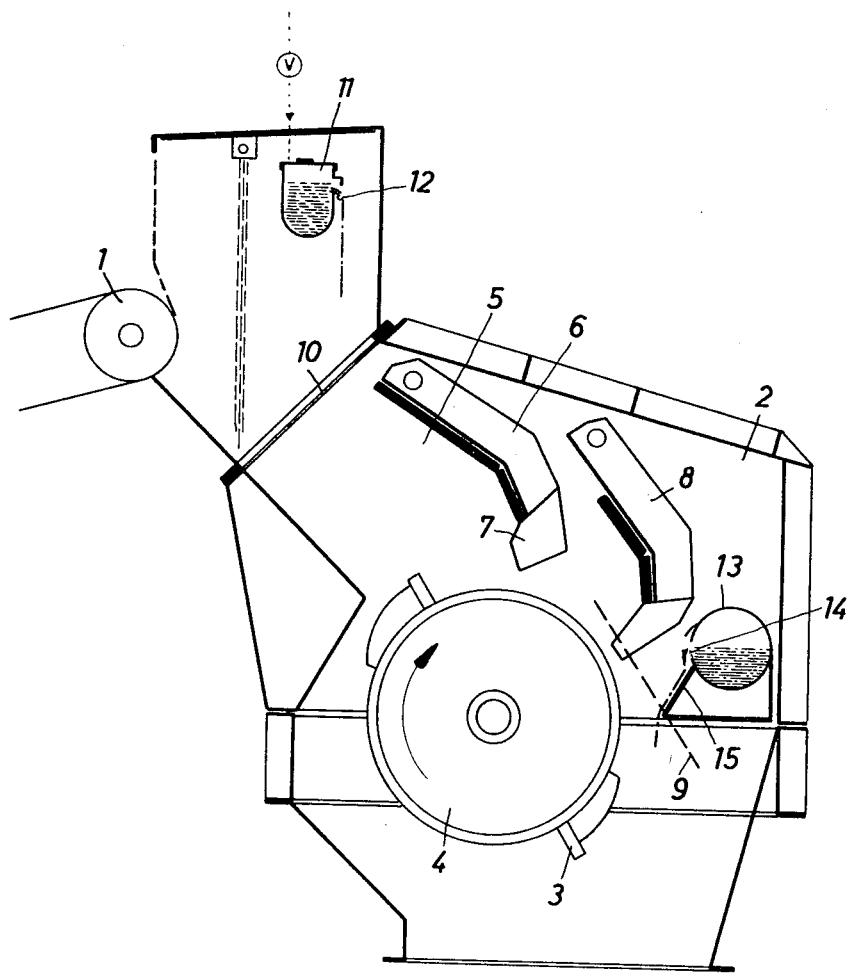
Inventor:
EUGEN VON CONRAD
KURT RÖSNER
LUDWIG MEYER

METHOD OF PROCESSING EFFLUENT SLUDGE

BACKGROUND OF THE INVENTION

The present invention relates to the treatment of wastes, and more particularly to the processing of effluent sludge. Still more particularly, the present invention relates to a method for processing of effluent sludge.

Effluent sludge is a by-product of waste water clarification, that is the clarification of effluents from the sewerage systems of towns and municipalities. The quantities of effluent sludge obtained as a result of waste water clarification are rather great and it is evident that it is necessary in some manner to dispose of this sludge. Conventionally, the sludge is stored in settling towers or tanks where it is exposed to the action of oxygen in the air and where it remains until it is digested; thereupon it is led to large settling fields where it is dried. Alternately, the drying can also be effected in special filters or presses which serve to partially remove the water content. However, after already undergoing all of these processing steps, the sludge is evidently not yet disposed of; to do this it is necessary to take the thus-prepared sludge and burn it, or subject it to further thermal drying in order to withdraw moisture to the point where the residue can be used as agricultural fertilizer.

Evidently, all of these processing steps are time consuming, require expensive plants which are large and which therefore need much space, and are generally bothersome. Especially with respect to the size of the plants required for the processing, it is pointed out that frequently inadequate space is available near the town or municipality, with the result that the plants must be located more or less remote from the town or municipality and must be connected with the municipal effluent clarification system via pumping conduits which may frequently have a length of several miles.

Finally, there is the fact that even if the effluent sludge is processed to the point where it can be used as an agricultural fertilizer, it is not much in demand, so that the only really practical method for disposing of the sludge has been that of burning it.

SUMMARY OF THE INVENTION

It is, accordingly, a general object of the present invention to overcome these disadvantages.

A more particular object of the present invention is to provide a method of disposing of effluent sludge in a simple, inexpensive, and reliable fashion substantially as it is produced.

In pursuance of the above objects, and others which will become apparent hereafter, one feature of our invention resides in a method of processing effluent sludge obtained from clarification of waste effluent, which method comprises, briefly stated, the step of conveying the effluent sludge to an impact grinder wherein solid refuse is being reduced and converted to particulate state, and admixing the effluent sludge with the refuse in the impact grinder.

Evidently, the refuse—that is, commercial as well as household refuse—of towns and municipalities must be processed in any case, and a widely used approach to this problem is to subject the refuse to grinding. Particularly suitable for this purpose are impact grinders which are capable of accepting all types of refuse, including bulky items. According to the invention, the effluent sludge is admixed with the refuse, it being evident that a homogenous mixture must take place. Thereupon, the refuse admixed with the effluent sludge can be disposed of in the usual manner. It is emphasized that in accordance with the present invention, it is essential that the admixture take place in an impact grinder. Other types of grinders, such as grinders constructed according to the hammer-mill principle, will not operate properly because, if effluent sludge is added to the refuse being processed, the mill will quickly become clogged and will further undergo particularly high wear. Furthermore, the use of grinders constructed on the hammer-mill process is not practical because these grinders are not suitable for grinding bulky refuse so that the versatility of the invention would be drastically reduced if use were to be made of grinders other than impact grinders.

Impact grinders, on the other hand, have a large grinding chamber which on the one hand is advantageous for the mixing procedure wherein the refuse is being admixed with the effluent sludge, whereas on the other hand the size of the grinding chamber discourages clogging. Our deliberations have shown that if a impact grinder is for instance used for grinding domestic refuse, the ratio of refuse and effluent sludge admixed therewith may be to the order of 1:0.5.

It is possible to admix the effluent sludge with the solid refuse in the impact grinder in several ways. Thus, the effluent sludge or a part thereof may be admitted into the impact grinder downstream of the last impact chamber thereof, that is at a location where the circulating ground refuse has been accelerated by the rotor to a high speed and advances in form of a thin veil or fog of ground material. In this case, it is advantageous to guide this finely ground veil of material over a slide, and to simultaneously let a thin layer of the effluent sludge flow over this slide. In this manner, the surfaces of the individual refuse particles are intimately coated and wetted with the effluent sludge which adheres thereto without any necessity for the effluent sludge to come into contact with the grinding instrumentalities of the impact grinder, thereby avoiding increased wear of these grinding elements as a result of contact with the effluent sludge in conjunction with ash contents of the refuse.

A further possibility is to admit a part of the effluent sludge—for instance one-half—into the grinding chamber for admixture with the refuse prior to or during the grinding, and to admix the remainder of the effluent sludge with the mixture of ground refuse and initially admitted effluent sludge which issues from the grinding chamber. The total quantity of effluent sludge added amounts to approximately one-half of the refuse by weight.

It will be appreciated that the ground refuse admixed with the effluent sludge in accordance with the present invention, can subsequently be treated, in conventional manner, that is it can either be allowed to rot or become digested—an action which is greatly increased and facilitated by the addition of the effluent sludge—or the mixture may be burned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic vertical section of an apparatus for carrying out the method according to the present invention.

DESCRIPTION OF THE PREFERRED EMBODIMENTS

Discussing now the drawing in detail, it will be seen that reference numeral 1 diagrammatically identifies a conveyor which serves to advance solid refuse to be ground. Of course, while diagrammatically a belt conveyor 1 is shown, other advancing means can be utilized.

An impact grinder is generally identified with reference numeral 2 and contains in known manner a rotor 4 which is provided with grinding instrumentalities such as teeth 3 on its exterior surface. Reference numeral 5 identifies the grinding chamber of the impact grinder and it will be appreciated by those skilled in the art that in conventional manner refuse admitted via the conveyor 1 into the chamber 5 will be contacted by the teeth 3 in response to rotation of the rotor 4, and flung around in the impact chamber 5, with the refuse being torn by contact with the teeth 3 and being reduced to particulate state by this contact, as well as by impacts on the wall means surrounding the chamber 5. The wall means 6 which cooperates with the rotor 4, and which is tiltable about the illustrated axis which latter is not identified with reference numerals, is provided with a set of teeth 7 located proximal to the circumference of the rotor 4, but in such a manner as not to interfere with the rotation thereof or with the teeth 3 of the rotor 4, in order to obtain improved grinding effects. Similar wall means 8, analogous to the wall means 6, is arranged somewhat downstream of the wall means 6, and the broken line intersecting the lower edges of the wall means 7 shows how ground refuse impacting upon the wall means 8 will be flung away substantially tangentially in the sense indicated by the broken line 9.

The illustrated embodiment uses two possibilities for admitting effluent sludge. Firstly, there is arranged in the inlet region of the impact grinder 2, above the inlet 10 leading to the impact grinding chamber 5, a receptacle 11 into which the effluent sludge is admitted in suitable manner, not illustrated in detail because it does not form a part of the invention. Valves may be provided for controlling the admission of effluent sludge into the receptacle 11. The latter is provided with an overflow edge 12 over which the effluent sludge continuously flows in a fine sheet, as symbolized by the dot-dash line. The thus-overflowing sludge enters through the inlet 10 into the grinding chamber 5, together with the incoming solid refuse, and is subjected to intimate homogenous admixture with the refuse as the same is being ground in the grinding chamber 5. Because of the resulting increase of exposed surface areas, occurring as a result of the breaking-up of the refuse into small particles, the ability of the refuse to absorb the sludge is vastly increased, in conjunction with the fact that these surface areas are constantly and advantageously exposed to the sludge during the grinding process.

The sludge admitted via the receptacle 11 amounts to only a portion—approximately half—of the total sludge which is to be admixed with the refuse passing through the impact grinder 2. Accordingly, there is arranged downstream of the wall means 8 a conduit 13 extending lengthwise of the wall means 8, that is in the direction normal to the plane of the drawing, and this is provided with a slot 14 as illustrated, over a lower edge of which a thin sheet of effluent sludge which is admitted into the conduit 13 as shown, will continuously flow in downward direction. Associated with the lower edge is a distributor baffle 15 extending along the lower edge over which the effluent sludge flows downwardly. It is evident that in its path the downwardly flowing effluent sludge on the baffle 15 intersects the broken line representing the direction in which ground refuse leaving the grinding chamber 5 is flung off, so that there occurs a constant and intimate admixture between this flung-off refuse and the effluent sludge flowing over the baffle 15.

Of course it will be appreciated that modifications are readily possible in the illustrated embodiment without departing in any way from the scope and concept of the present invention. Thus, the receptacle 11 could be omitted, or conversely the conduit 13 could be omitted. In either case, the totality of effluent sludge to be admitted would then be admitted through the remaining conduit 13 or receptacle 11, respectively. Furthermore, all of the effluent sludge could be admitted directly into the grinding chamber 5, or again a part of the effluent sludge could be admitted directly into the grinding chamber 5 with the remainder admitted via the conduit 13 as illustrated. In addition it will be clear that other structural details can be varied, for instance the teeth 3 which are fast with the rotor 4 in the illustrated embodiment can be replaced by other impact instrumentalities, for instance movable hammers or the like, without in any way effecting the concept of the invention.

It will be understood that each of the elements described above, or two or more together, may also find a useful application in other types of applications differing form the types described above.

While the invention has been illustrated and described as embodied in a method of processing effluent sludge, it is not intended to be limited to the details of the apparatus shown for carrying out the method, since various modifications and structural changes may be made without departing in any way from the spirit of the present invention.

What is claimed as new and desired to be protected by Letters Patent is set forth in the appended claims:

1. A method of processing waste matter, comprising the steps of conveying solid refuse, including bulky refuse, to an impact grinder; admixing with said solid refuse sewage sludge obtained by clarification of waste effluent; and subjecting the thus obtained mixture to comminution in said impact grinder so as to reduce said solid refuse to particulate state and form a comminuted mass composed of particles of solid refuse admixed with said sewage sludge.

2. A method as defined in claim 1; and further comprising the steps of discharging the mixture of particulate refuse and sewage sludge from said impact grinder; and subjecting such mixture to processing leading to rotting or digesting of the mixture.

3. A method as defined in claim 1, said impact grinder having a grinding chamber into which said refuse enters and from which it issues in reduced state; and wherein the step of admixing comprises adding a first quantity of said sewage sludge to said refuse entering said grinding chamber, and adding a substantially equal second quantity of said sewage sludge to the mixture of particulate refuse and sewage sludge issuing from said grinding chamber.

4. A method of processing waste matter, comprising the steps of conveying unprocessed solid refuse, including bulky refuse, into an impact grinder; reducing said solid refuse in said impact grinder mixed with sewage sludge obtained by clarification of waste effluent, to particulate state so as to form an intimate mixture of refuse particles and sludge; and discharging the resulting mixture from said impact grinder.

5. A method as defined in claim 4, comprising the step of admixing said sewage sludge with said refuse partially subsequent to reduction of the latter to particulate state.

6. A method as defined in claim 4, comprising the step of admixing said sewage sludge with said refuse in a ratio of 1:2 by weight.

7. A method as defined in claim 5, said impact grinder having a grinding chamber in which said refuse is reduced to and from which it issues in particulate state; and comprising the step of admixing parts of said sewage sludge with said refuse subsequent to issuing of said refuse from said grinding chamber.

8. A method as defined in claim 4, comprising the step of admixing said sewage sludge with said refuse in a predetermined weight ratio.

* * * * *